United States Patent [19]

Katsumi

[11] Patent Number: 4,962,302
[45] Date of Patent: Oct. 9, 1990

[54] CONTROL APPARATUS FOR AUTOMOBILE AIR-CONDITIONERS

[75] Inventor: Iida Katsumi, Konan, Japan

[73] Assignee: Diesel Kiki Co., Ltd., Japan

[21] Appl. No.: 430,606

[22] Filed: Nov. 2, 1989

[30] Foreign Application Priority Data

Nov. 4, 1988 [JP] Japan .................................. 63-278944

[51] Int. Cl.[5] ........................ G05D 23/00; B60H 1/00
[52] U.S. Cl. .................................... 236/13; 236/91 E; 165/26; 165/42; 62/244
[58] Field of Search .................... 62/239, 244; 98/2.01; 236/13, 49.1, 49.3, 91 F, 91 C, 91 E, 91 R, 91 D; 165/16, 26, 27, 28, 30, 42, 43

[56] References Cited

U.S. PATENT DOCUMENTS

| | | | |
|---|---|---|---|
| 4,538,760 | 9/1985 | Kobayashi | 236/13 |
| 4,560,106 | 12/1985 | Dorsch | 236/91 E |
| 4,617,986 | 10/1986 | Kobayashi et al. | 236/91 C |
| 4,819,715 | 4/1989 | Kobayashi | 165/27 X |

Primary Examiner—Harry B. Tanner
Attorney, Agent, or Firm—Wenderoth, Lind & Ponack

[57] ABSTRACT

An apparatus for controlling an automobile airconditioner includes a discharge mode selection device for selecting a discharge mode depending on the magnitude of a discharge mode changeover criterion signal calculated based on at least a vehicle compartment temperature and a setting temperature, and a correction device for correcting a discharge mode selection criterion based on the temperature of an upper-part of the vehicle compartment and a set upperpart temperature. With this arrangement, the discharge mode selection is carried out with due consideration on the occupant's sense of comfortableness in the vicinity of its head.

5 Claims, 6 Drawing Sheets

CONTROL APPARATUS FOR AUTOMOBILE AIR-CONDITIONERS

BACKGROUND OF THE INVENTION

1. Field of the Invention:

The present invention relates generally to controllers for automobile air-conditioners, and more particularly to an apparatus for automatically controlling the changeover of the discharge mode of an automobile air-conditioner.

2. Description of the Prior Art:

One example of air-conditioner controllers of the type described is disclosed in Japanese Pat. Laid-open Publication No. 57-186511. The disclosed controller is constructed to correct the discharge air temperature according to the output from a sunlit portion temperature sensor and simultaneously change over the discharge mode. According to another controller known from Japanese Pat. Publication No. 63-244, the discharge mode is changed into the bi-level mode when the output from a sunlit portion temperature sensor exceeds a predetermined value and an occupant does not feel heat on the upper part of its body.

In the known controllers, the temperature of the upper part of a vehicle compartment is not taken into account for the control of the changeover of the discharge mode. Rather, the changeover of the discharge mode is achieved based on a presumption that the sunshine will require a supply of cooled air from a vent outlet into the vehicle passenger compartment. Such presumptive mode change has a problem that the vent outlet is opened even when the temperature in the vicinity of the head of the occupant is low and hence the supply of cooled air is not necessary. Furthermore, with the known controllers, the discharge mode of the air-conditioner is controlled to demonstrate a predetermined changeover performance without variation, regardless of differences in feeling among individual users or occupants.

SUMMARY OF THE INVENTION

With the foregoing difficulties in view, it is an object of the present invention to provide a control apparatus for an automobile air-conditioner, which is capable of controlling the discharge mode changeover operation reliably, in conformity with the physical sensation of an occupant.

Another object of the present invention is to provide a control apparatus for an automobile air-conditioner, which is capable of providing a feeling of comfortable air-conditioning to the head portion of an occupant.

According to a first aspect of the present invention, there is provided an apparatus for controlling an automobile air-conditioner, comprising a vehicle compartment temperature sensor for detecting a representative temperature in a vehicle compartment; an upper-part temperature sensor for detecting a temperature of an upper part of the vehicle compartment; a temperature setter for setting a temperature in the vehicle compartment; an upper-part temperature setter for setting a temperature of the upper part of the vehicle compartment; mode doors disposed respectively at a plurality of differently directed outlets for changing the discharge mode of the air-conditioner; mode control value calculation means for calculating a mode control value concerned in the control of the discharge mode, based on at least the detected representative vehicle compartment temperature and the setting vehicle compartment temperature; correction means for correcting a changeover criterion based on at least the detected upper-part temperature and the setting upper-part temperature until a deviation of the detected upper-part temperature from the setting upper-part temperature is canceled out; discharge mode selection means for selecting a discharge mode corresponding to the mode control value, based on the changeover criterion corrected by the correction means; and drive control means for controlling the operation of the mode doors depending on the result of selection by the discharge mode selection means.

According to a second aspect of the present invention, there is provided an apparatus for controlling an automobile air-conditioner, comprising: a vehicle compartment temperature sensor for detecting a representative temperature in a vehicle compartment; an upper-part temperature sensor for detecting a temperature of an upper part of the vehicle compartment; a temperature setter for setting a temperature in the vehicle compartment; an upper-part temperature setter for setting a temperature of the upper part of the vehicle compartment; mode doors disposed respectively at a plurality of differently directed outlets for changing the discharge mode of the air-conditioner; air-mix door opening calculation means for calculating an opening of an air-mix door of the air-conditioner based on at least the detected representative vehicle compartment temperature and the setting vehicle compartment temperature; a mode sensor for detecting a cooling capacity of an evaporator of the air-conditioner; discharge air temperature calculation means for calculating a temperature of air to be discharged into the vehicle compartment based on the opening of the air-mix door and an output of the mode sensor; correction means for correcting a changeover criterion based on at least the detected upper-part temperature and the setting upper-part temperature until a deviation of the detected upper-part temperature from the setting upper-part temperature is canceled out; discharge mode selection means for selecting a discharge mode corresponding to the discharge air temperature calculated by the discharge air temperature calculation means, based on the changeover criterion corrected by the correction means; and drive control means for controlling the operation of the mode doors depending on the result of selection by the discharge mode selection means.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to certain preferred embodiments shown in the accompanying drawings.

Figure 1:
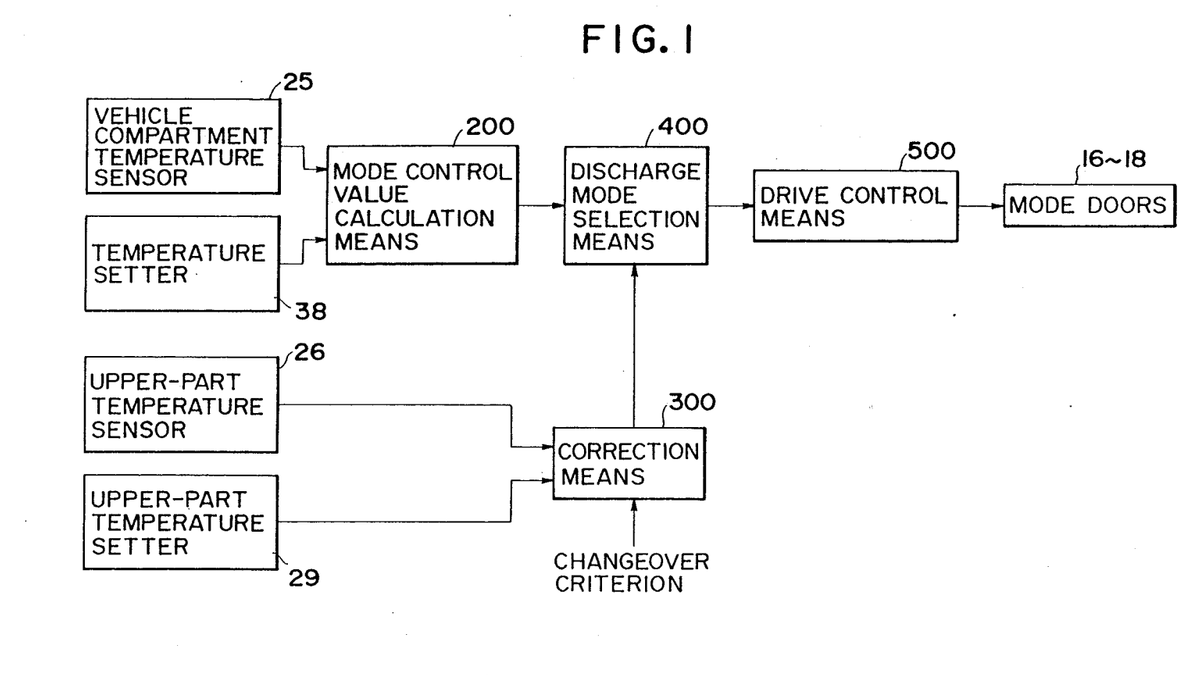
FIG. 1 a block diagram of an apparatus for controlling an automobile air-conditioner according to a first embodiment of the present invention.

As shown in FIG. 1, a control apparatus for an automobile air-conditioner according to a first embodiment of the present invention generally includes a vehicle compartment temperature sensor 25 for detecting a representative temperature in a vehicle compartment, an upper-part temperature sensor 26 for detecting a temperature of an upper part of the vehicle compartment, a temperature setter 38 for setting a temperature in the vehicle compartment, an upper-part temperature setter 39 for setting a temperature of the upper part of the vehicle compartment, mode doors 16-18 disposed respectively at a plurality of differently directed outlets for changing the discharge mode of the air-conditioner, mode control value calculation means 200 for calculating a mode control value concerned in the control of the discharge mode, based on at least the detected representative vehicle compartment temperature and set vehicle compartment temperature, correction means 300 for correcting a changeover criterion based on at least the detected upper-part temperature and the set upper-part temperature until a deviation of the detected upper-part temperature from the set upper-part temperature is canceled out, discharge mode selection means 400 for selecting a discharge mode corresponding to the mode control value, based on the changeover criterion corrected by the correction means 300, and drive control means 500 for controlling the operation of the mode doors 16-18 depending on the result of selection by the discharge mode selection means 400.

Figure 2:
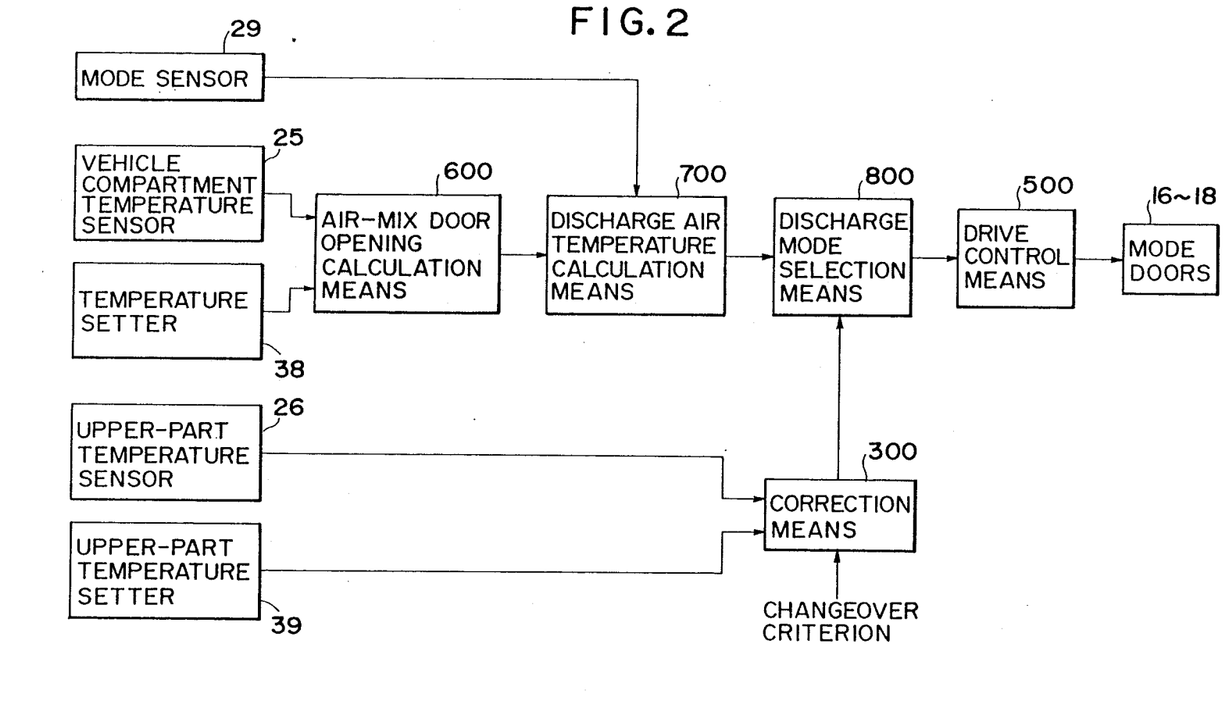
FIG. 2 is a block diagram of an apparatus for controlling an automobile air-conditioner according to a second embodiment of the present invention.

FIG. 2 shows a control apparatus for an automobile air-conditioner according to a second embodiment of the present invention. The control apparatus generally includes a vehicle compartment temperature sensor 25 for detecting a representative temperature in a vehicle compartment, an upper-part temperature sensor 26 for detecting a temperature of an upper part of the vehicle compartment, a temperature setter 38 for setting a temperature in the vehicle compartment, an upper-part temperature setter 39 for setting a temperature of the upper part of the vehicle compartment, mode doors 16-18 disposed respectively at a plurality of differently directed outlets for changing the discharge mode of the air-conditioner, air-mix door opening calculation means 600 for calculating an opening of an air-mix door of the air-conditioner based on at least the detected representative vehicle compartment temperature and set vehicle compartment temperature, a mode sensor 29 for detecting a cooling capacity of an evaporator of the air-conditioner, discharge air temperature calculation means 700 for calculating a temperature of air to be discharged into the vehicle compartment based on the opening of the air-mix door and an output of the mode sensor 29, correction means 300 for correcting a changeover criterion based on at least the detected upper-part temperature and the set upper-part temperature until a deviation of the detected upper-part temperature from the set upper-part temperature is canceled out, discharge mode selection means 800 for selecting a discharge mode corresponding to the discharge air temperature calculated by the discharge air temperature calculation means 700, based on the changeover criterion corrected by the correction means 300, and drive control means 500 for controlling the operation of the mode doors depending on the result of selection by the discharge mode selection means 800.

Figure 3:
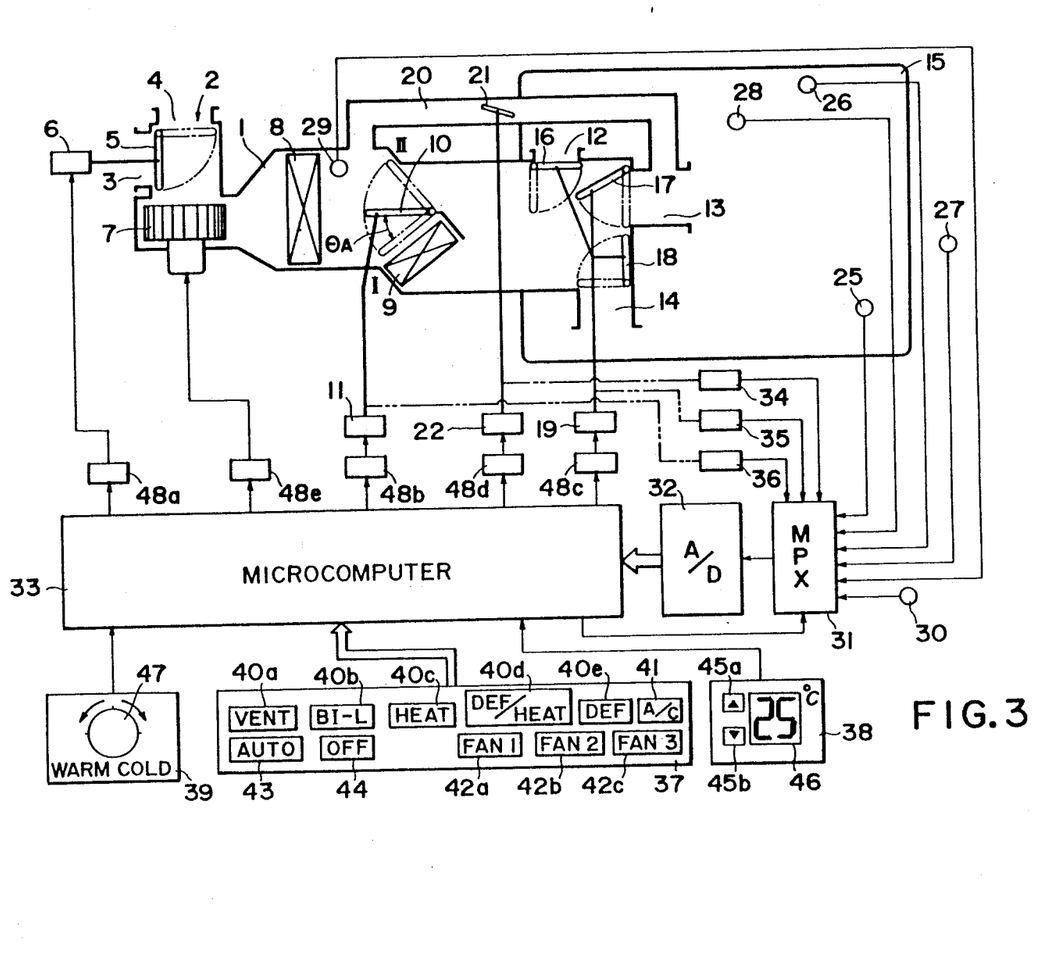
FIG. 3 is a diagrammatical view illustrative of the structural details of an automobile air-conditioner incorporating a control apparatus according to the present invention.

As shown in FIG. 3, an automobile air-conditioner in which a control apparatus according to the present invention is incorporated includes a main air-flow duct 1 having an intake door changeover device 2 at the upstream end thereof. The intake door changeover device 2 includes a selecting door 5 disposed at the junction between a recirculated air inlet 3 and an outside air inlet 4 that are provided in bifurcated fashion. The selecting door 5 is operatively connected to an actuator 6 and driven by the latter to select one of the inlets 3, 4 for allowing the recirculated air or the outside air to be drawn into the duct 1.

A blower 7 is disposed in the duct 1 immediately downstream of the changeover device 2 to force the air to flow downstream through the duct 1. The duct 1 also includes an evaporator 8 and a heater core 9 disposed downstream of the blower 7 in the order named.

The evaporator 8 is connected in fluid circuit with a compressor and other components (neither shown) to jointly constitute a refrigeration cycle or system for cooling air passing around the evaporator 8. The heater core 9 serves to heat air passing therearound by the heat-exchange action between air and an engine cooling water recirculating through the heater core 9. An air-mix door 10 is disposed in front of the heater core 9 and operatively connected to an actuator 11. The position of the air-mix door 10 is regulated by the actuator 11 to vary the opening $\theta A$ thereof to thereby adjusting the ratio of the amount of air flowing directly through the heater core 9 to the amount of air bypassing the heater core 9. The temperature of air to be discharged or blown-off from the duct 1 is thus controlled at a desired temperature.

The opening of the air-mix door 10 is maximum (100%) when the air-mix door 10 is disposed in the full-cool position designated by reference character I in FIG. 3 and is minimum (0%) when the air-mix door 10 is disposed in a full-heat position designated by II in the same figure.

The duct 1 has at its downstream end a defroster outlet 12, a vent outlet 13 and heat outlet 14 that are provided in branched fashion and all open to a vehicle compartment. Three mode doors 16, 17, 18 are disposed at the respective outlets 12, 13, 14 for selecting a desired discharge mode of the air-conditioner under the control of an actuator 19.

The air-conditioner further includes a bypass duct or passage 20 bypassing a portion of the main duct 1. The bypass passage 20 has one end opening to the duct 1 at a position between the evaporator 8 and the heater core 9, the other end of the bypass passage 20 opening to the duct 1 at a position immediately upstream of the vent outlet 13. With the bypass passage 20 thus arranged, air cooled by the evaporator 8 is directly supplied to the vent outlet 13. The amount of cooled air supplied through the bypass passage 20 is variable with the opening θB a bypass door 21 which is disposed in the bypass passage 20 and controlled by an actuator 22.

The representative temperature sensor 25 for detecting a representative temperature TR in the vehicle compartment 15 is disposed on an appropriate part of the vehicle compartment 15 such as an instrument panel. The upper-part temperature sensor 26 for detecting a temperature TRh in the vicinity of the head of an occupant is disposed on the ceiling of the vehicle compartment 15. Designated by 27 is an outside air temperature sensor for detecting a temperature TA outside the vehicle compartment 15, 28 a sunlit portion temperature sensor for detecting a temperature TS of a portion exposed to the incident light of the sun. The mode sensor 30 for detecting a cooling capacity of air passed through the evaporator 8 is disposed either on the evaporator 8 or immediately downstream of the evaporator 8 and indicates such a cooling capacity in terms of the temperature of air passed from the evaporator 8. Denoted at 30 is a cooling water temperature sensor 30 for detecting a temperature of engine cooling water. Output signals from the foregoing sensors 25–30 are inputted through a multiplexer (MPX) 31 into an A/D converter 32 in the order selected by the multiplexer 31. After having been digitalized by the A/D converter 32, the output signals are supplied to a microcomputer 33.

Designated by 34 is an opening sensor for detecting the opening of the bypass door 21, 35 a position sensor for detecting the position of the respective mode doors 16, 17, 18, and 36 an opening sensor for detecting the opening of the air-mix door 10. Output signals from these sensors 34, 35, 36 are inputted through the multiplexer 31 and the A/D converter 32 into the microcomputer 33.

The microcomputer 33 is also supplied with output signals from the instrument panel 37, the temperature setter 38 and the upper-part temperature setter 39.

The instrument panel 37 is provided with a series of mode switches 40a, 40b, 40c, 40d, 40e for manually setting the discharge mode to a vent mode (VENT), a bi-level mode (BI-L), a heat mode (HEAT), a defrost/heat mode (DEF/HEAT) and a defrost mode (DEF), respectively, a start switch (A/C) 41 for starting the operation of the refrigeration system, a series of fan switches 42a, 42b, 42c for selectively changing the rotational speed of the blower 7 between a succession of low (FAN 1), medium (FAN 2) and high (FAN 3) levels, an automatic switch (AUTO) 43 for automatically controlling the operation of all the components of the air-conditioner including the blower 7, and an off switch (OFF) 44 for stopping the operation of the components of the air-conditioner.

The temperature setter 38 is composed of up-down switches 45a, 45b, and a display unit 46 associated with the switches 45a, 45b for indicating the temperature set by the switches 45a, 45b. The up-down switches 45a, 45b are actuated to vary the setting temperature within a predetermined range. The upper-part temperature setter 39 is of the rotary type which is capable of turning about its axis between two extreme angular positions (COLD, WARM) to adjustably set the upper-part temperature within a predetermined range, The temperature setter 38 and the upper-part temperature setter 39 may be of the slide type having a slidably temperature setting lever adapted to be manually actuated to adjustably set the desired temperature.

The microcomputer 33 is of the conventional type known per se and comprises a central processing unit (CPU), a read only memory (ROM), a random access memory (RAM), and an input/output port (I/O), nether shown. The microcomputer 33 arithmetically processes the various input signals stated above to produce control signals and then issues the control signals through respective driver circuits 48a, 48b, 48c, 48d, 48e to the actuators 6, 11, 19, 22 and a motor of the blower 7 for controlling the operation of the respective doors 5, 10, 16, 17, 18, 21 and the rotation of the blower motor.

Figure 4:
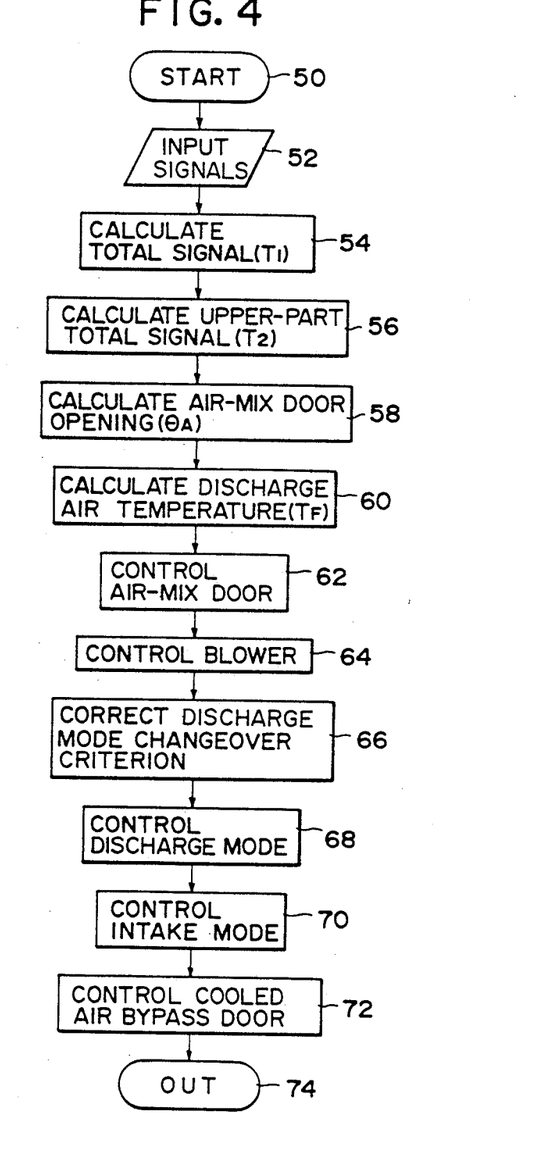
FIG. 4 is a flowchart showing a control routine achieved by a microcomputer in the control apparatus for controlling mode doors of the air-conditioner.

The operation of the microcomputer 33 will be described below with reference to a flowchart shown in FIG. 4 in which a main control routine for the control of the components of the automobile air-conditioner is illustrated.

When a non-illustrated main switch is turned on, the main control routine of the microcomputer 33 starts in a step 50 in accordance with a program stored in the microcomputer 33. In the next step 52, various signals are inputted from the temperature setters and the sensors into the microcomputer 33. Then, based on a vehicle compartment temperature TR, an outside air temperature TA, a sunlit portion temperature TS and a setting temperature Tset, a total signal T1 is calculated in accordance with the following equation (1).

$$T1 = KA \cdot TR + KA \cdot TA + KS \cdot TS - Kset \cdot Tset \ldots \quad (1)$$

where KR, KA, KS and Kset are calculation constants.

This equation (1) indicates the fact that the larger the total signal T1, the greater the thermal load for cooling of the vehicle compartment and the smaller the total signal T1, the greater the thermal load for heating of the vehicle compartment.

Then, the control goes on to a step 56 for calculating an upper-part total signal T2 based on an upper-part temperature TRh, the sunlit portion temperature TS and a setting upper-part temperature Tseth, in accordance with the following equation (2).

$$T2 = a \cdot TRh + b \cdot TS - c \cdot Tseth \ldots \quad (2)$$

where a, b and c are calculation constants.

This equation (2) indicates the fact that the necessity for the cooling in the vicinity of the head of an occupant is increased as the upper-part total signal T2 increases, and the necessity for the heating of the vehicle compartment in the vicinity of the occupant's head is increased as the upper-part total signal T2 decreases.

Figure 5:
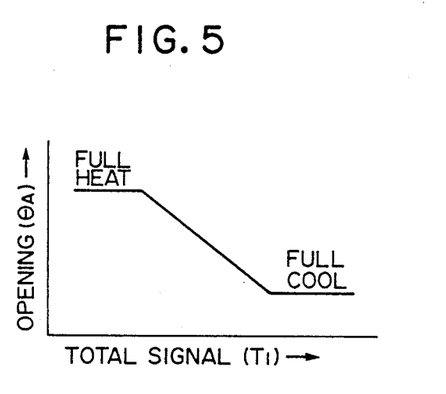
FIG. 5 is a graph showing a performance curve of an air-mix door.

Then the control proceeds to a step 58 in which an opening of the air-mix door 10 is calculated based on a predetermined control pattern shown for example in FIG. 5 which is determined based on the total signal T1 obtained in the step 54. In the next step 60, a temperature TF of air to be discharged into the vehicle compartment is calculated based on an output value TE from the mode sensor 29 and an opening θA calculated in the step 58, in accordance with the following equation (3).

$$TF = TE + \beta \cdot \theta A \ldots \quad (3)$$

where β is a calculation constant.

Thereafter, the control goes on to a step 62 for driving the air-mix door 10 to a position in which the air-mix door 10 has an opening equal to the opening θA calculated in the step 58. In the next following step 64, the rotational speed of the blower 7 is controlled according to the value of the total signal T1.

The control further proceeds to a step 66 in which discharge mode changeover criteria TF1, TF2, TF3, TF4, TF5, TF6, TF7, TF8 are corrected according to the value of the upper-part total signal T2, in preparation for a next step 68. The correction is achieved by adding to values t1, t2, t3, t4, t5, t6, t7, t8 predetermined for TF1–TF8, respectively, a correction term α·T2, as shown in Table 1.

TABLE 1

| TF1 | TF2 | TF3 | TF4 |
|---|---|---|---|
| t1 + α · T2 | t2 + α · T2 | t3 + α · T2 | t4 + α · T2 |
| TF5 | TF6 | TF7 | TF8 |
| t5 + α · T2 | t6 + α · T2 | t7 + α · T2 | t8 + α · T2 |

In the correction term α·T2, α is a calculation constant. The values for TF1–TF8 are gradually reduced in the order named.

Based on the changeover criteria TF1–TF8 as corrected in the manner stated above, the discharge mode is changed in the step 68, after which the intake mode is set in a step 70. Then the control proceeds to a step 72 for controlling the cooled air bypass door 21. In this cooled air bypass door control step, the opening θB of the cooled air bypass door 21 is calculated in accordance with the following equation (4) and then the microcomputer 33 issues a output control signal to drive the cooled air bypass door 21, via the driver circuit 48d and the actuator 22, to a position in which the cooled air bypass door 21 has an opening equal to the calculated opening.

$$\theta B = KRh \left( \Delta TRh + \frac{1}{T} \int_0^T \Delta TRh\, dt \right) \quad (4)$$

where KRh is a calculation constant, and ΔTRh is the difference between an upper-part temperature set by the upper-part temperature setter 39 and an upper-part temperature detected by the upper-part temperature sensor 26. The control goes on to a step 74 from which the control goes to another control routine.

Figure 6:
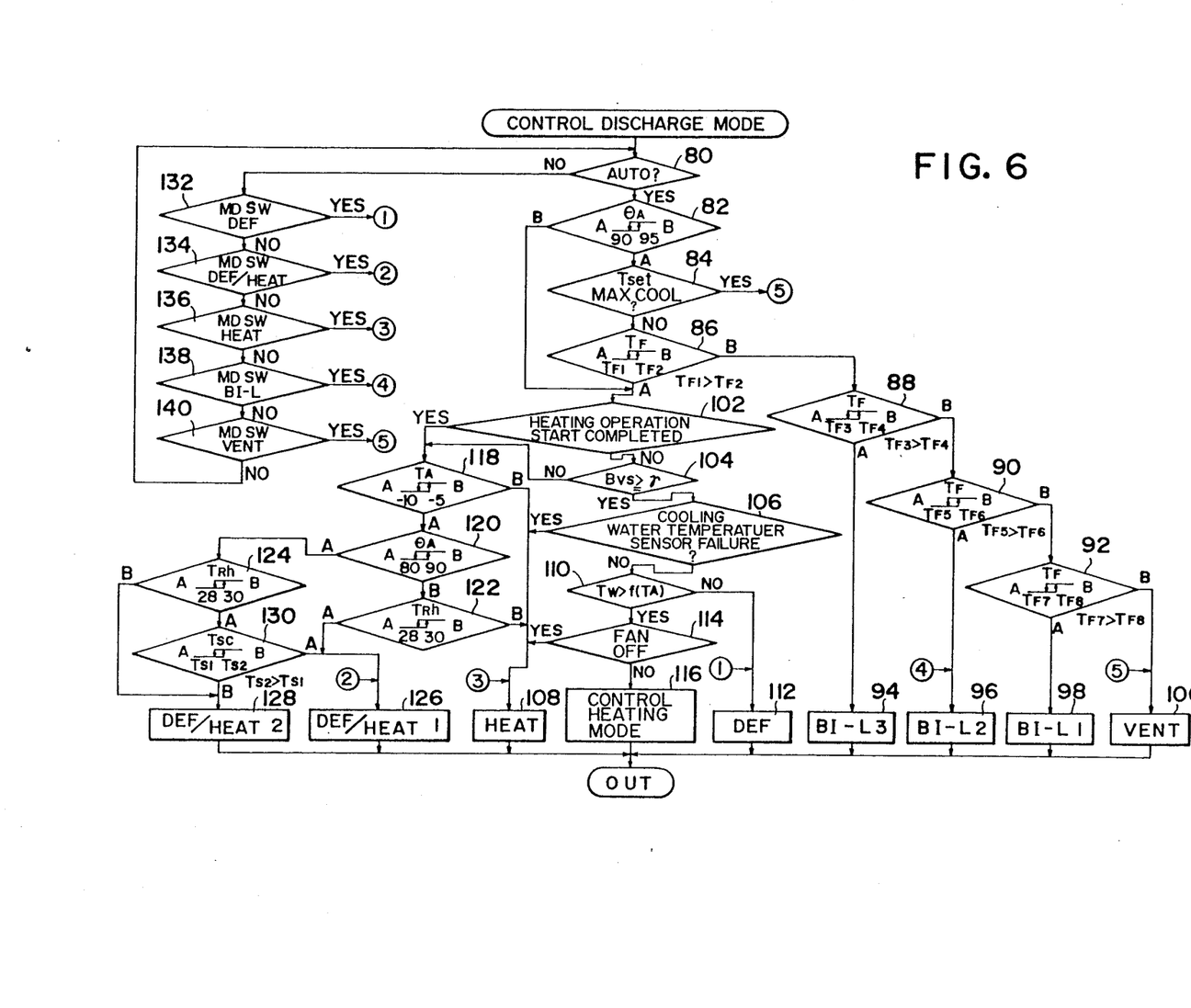
FIG. 6 is a flowchart showing control subroutines for discharge mode control operation.

FIG. 6 shows a control subroutine achieved by the microcomputer 33 for the discharge mode control. In a step 80, it is judged whether the AUTO switch 43 is turned on and hence the discharge mode changeover operation is achieved automatically. If yes, then the control goes on to a step 82.

In the step 82, a judgment is made to determine as to whether the actual opening θA of the air-mix door 10 is smaller than a predetermined value (e.g., 90%–95%) near the full-heat position. If yes, the control goes on to a step 84 for executing a further judgment whether the setting temperature Tset is set to a minimum value which requires a maximum cooling. If the judgment in the this step 84 indicates that Tset is equal to the minimum value, then the control proceeds to a step 100 to fully open solely the vent opening 13, thereby setting the discharge mode to the vent (VENT) mode. If the judgment in the step 84 shows that Tset is not equal to the minimum value, then the control goes on to a step 86. In the step 86, it is judged whether the discharged air temperature TF is lower than the above-mentioned changeover criteria TF1, TF2. If yes (B), the control proceeds to a step 88 in which a judgment is made to determine as to whether the discharged air temperature TF is lower than the changeover criteria TF3, TF4. If the judgment indicates that TF<TF3, TF4, then the control goes on in a direction (B) to a step 90 for judging whether TF is smaller than the changeover criteria TF5, TF6. If yes, the control follows the way (B) to a step 92 in which a further judgment is made to determine as to whether TF is smaller than the changeover criteria TF7, TF8.

If the judgment in the step 88 indicates that TF>TF3, TF4, then the control goes on in a direction (A) to a step 94 to set the discharge mode to a bi-level (BI-L 3) mode in which the ratio of the amount of air discharged from the vent outlet 13 to the amount of air discharged from the heat outlet 14 is set to 3:7. Similarly, if the judgment in the step 90 indicates that TF>TF5, TF6, then the control follows the way (A) to a step 96 in which the discharge mode is set to a bi-level (BI-L 2) mode. In this BI-L 2 mode, the ratio of the amount of air discharged from the vent outlet 13 to the amount of air discharged from the heat outlet 14 is set to 5:5. If the judgment in the step 92 indicates that TF>TF7, TF8, then the control goes on in a direction (A) to a step 98 to set the discharge mode to a bi-level (BI-L 1) mode in which the ratio of the amount of air discharged from the vent outlet 13 to the amount of air discharged from the heat outlet 14 is set to 7:3. Alternately, if the judgment in the step 92 indicates TF<TF7, TF8, then the control follows the way (B) to the step 100 to change the discharge mode to the VENT mode.

If the judgment in the step 82 indicates that the opening θA of the air-mix door 10 is larger than the predetermined value (90%–95%) close to the full-heat position, then the control proceeds in a direction (B) to a step 102. Likewise, if the judgment in the step 86 indicates that TF> TF1, TF2, the control follows the way (A) to the steps 102. In the step 102, a further judgment is made to determine whether the heating operation start is completed based on the temperature of the engine cooling water. This judgment is necessary to limit the control of heating operation at the initial stage of engine running because the engine cooling water is still cool. If the judgment in this step 102 indicates that the heating operation start has not been completed, then the control goes on to a step 104 in which a further judgment is made to determine as to whether a supply voltage BVS to the motor of the blower 7 is greater than a predetermined value Γ. If yes, this means that the heating operation start has not completed and the blower 7 is driven at a large flow rate. In this condition, a considerable amount of cooled air is blown off toward the feet of the occupant, so that the amount of air to be discharged toward the occupant's feet must be limited in a step 106 and onwards.

In the step 106, it is judged whether the engine cooling water temperature sensor 30 is at fault. If yes, this means the judgment on the completion of the start of heating operation is not possible. Then the control goes on to a step 108 to close the vent outlet 13 and open the heat outlet 14, thereby setting the discharge mode to the heat (HEAT) mode, other than executing a non-reliable control of the heating condition. In this HEAT mode, the amount of defrost bleeding (amount of air blown-off from the vent defrost outlet 12) is 20% of the entire air flow rate. If the judgment in the step 106 indicates the normal condition of the engine cooling water temperature sensor 30, then the control proceeds to a step 110 to judge whether the temperature TW of the engine cooling water is higher than a predetermined value f(TA)

calculated based on the outside air temperature TA. If TW<f(TA), then the control goes on to a step 112 to set the discharge mode to the defrost (DEF) mode in which only the defrost outlet 12 is fully opened to prevent blowing-off of cooled air towards the occupant's feet.

Figure 7:
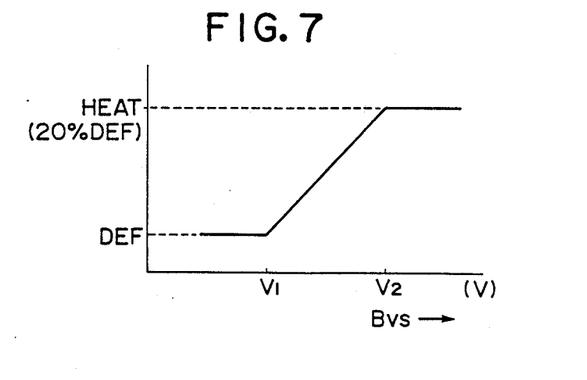
FIG. 7 is a graph showing a performance curve of a blower taken with respect to a supply voltage to the blower and a discharge mode.

If TW>f(TA), then the control proceeds to a step 114 to judge whether the blower 7 is stopped. If the blower 7 is inoperative, this means that cooled air is no longer supplied toward the occupant's feet. Then the control proceeds to the step 108 to set the discharge mode to the HEAT mode. Alternately, the blower 7 is operating, then the control goes on to a step 116 in which the discharge mode is set the heating mode in view of the supply voltage BVS for the motor of the blower 7 based on a predetermined control pattern shown in FIG. 7.

If the judgment in the step 102 indicates the completion of the start of heating operation, or if the judgment in the step 104 indicates BVS<Γ, then the control goes on to a step 118 for making judgment to determine as to whether the outside air temperature TA is lower than a predetermined temperature (e.g., −10° C.−−5° C.). If no, then the control goes on in a direction (B) to the step 108 to set the discharge mode to the HEAT mode. Alternately, if TA is lower than the predetermined temperature, this means that air must be blown-off from the defrost outlet 12 against the windshield to prevent frosting of the windshield. Then the control proceeds to a step 120.

In the step 120, it is judged whether the actual opening θA of the air-mix door 10 is greater than a predetermined opening (e.g., 80%–90%) and hence is able to provide a certain large heating capacity. If BA is larger than the predetermined opening, i.e., the air-mix door 10 is located close to the full-heat position, then the control proceeds to a step 122. Conversely, if θA is smaller than the predetermined opening, i.e., the air-mix door 10 is displaced toward the full-cool position, then the control goes on to a step 124. In both steps 122, 124, it is judged whether the upper-part temperature TRh is higher than a predetermined value (e.g., 28° C.-30° C.). If the judgment in the step 122 indicates that TRh is higher than the predetermined value, then the control goes on in a direction (B) to the step 108 for setting the discharge mode to the HEAT mode in which the amount of heated air discharged from the defrost outlet 12 is limited to a minimum. Alternately, if TRh is lower than the predetermined value, then the control proceeds to a step 126 to change the discharge mode to a first defrost/heat (DEF/HEAT 1) mode in which the defrost bleeding is limited to a small value such as 35%. If the judgment in the step 124 indicates that TRh is higher than the predetermined value, this means that the opening θA of the air-mix door 10 is smaller than the predetermined value (80%-90%) and hence the upper-part is not heated even when the defrost bleeding is increased to some extent. Then the control goes on in a direction (B) to a step 128 for changing the discharge mode to a second defrost/heat (DEF/HEAT 2) mode in which the defrost bleeding is set to 50% for example. If TRh is smaller than the predetermined value, then the control proceeds to a step 130 to correct the sunlit portion temperature based on the output value TSC from the sunlit portion temperature sensor 28. Assuming that TSC is smaller than predetermined values TS1, TS2, in addition to a small amount of incident light of the sun, i.e., a low sunlit portion temperature, the opening of the air-mix door 10 is smaller than the predetermined value and hence the temperature of blown-off air is low. Under such condition, if the flow rate of air discharged from the defrost outlet 12 is increased, the discharged air is further cooled as it flows along the windshield, thus lowering the upper-part temperature below a comfortable value. As a consequence, the control goes on to the step 126 to change the discharge mode to the first defrost/heat (DEF/HEAT 1) mode in which the defrost bleeding is limited to a small value. Conversely, when subjected to a large amount of incident right of the sun, the occupant feels at its head portion a sense of overheating by the sunshine. Such a sense of overheating can be cleared up by increasing the defrost bleeding, so that the discharge mode is changed to the second defrost/heat (DEF/HEAT 2) mode. The judgment based on TRh in the step 124 may be omitted because a change of the TRh is related to a change of the opening of the air-mix door 10.

The automatic changeover control of the discharge mode has been described. This automatic changeover control is shifted to a manual changeover control when any one of the mode switches 40a–40e is activated. In this instance, the control is shifted from the step 80 to a succession of steps 132–140 each of which a judgment is made to determine as to whether a corresponding one of the mode switches 40a–40e is activated. If the defrost (DEF) switch 40e is activated to select the defrost (DEF) mode, then the control goes on to the step 112. Likewise, if the defrost/heat (DEF/HEAT) switch 40d is activated to select the defrost/heat (DEF/HEAT) mode, then the control goes on to the step 126. When the heat (HEAT) switch 40c is activated, to select heat (HEAT) mode, then the control goes on to the step 108. If the bi-level (BI-L) switch 40b is activated to select the bi-level (BI-L) mode, then the control goes on to the step 96. Further, if the vent (VENT) switch 40a is activated to select the vent (VENT) mode, the control goes on to the step 100. The manual changeover control can be shifted to the automatic changeover control when the automatic (AUTO) switch 43 is activated.

As described above, the discharge mode is changed based on the changeover criteria TF1–TF8 which are corrected by the upper-part total signal T2. Accordingly, the changeover criteria TF1–TF8 are increased with an increase of the upper-part temperature resulting from an increase of the amount of incident light of the sun and with a movement of the temperature setter toward the cold side with the result that the changeover timing to the vent (VENT) mode is advanced.

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling an automobile air-conditioner, comprising:
   (a) a vehicle compartment temperature sensor for detecting a representative temperature in a vehicle compartment;
   (b) an upper-part temperature sensor for detecting a temperature of an upper part of the vehicle compartment;
   (c) a temperature setter for setting a temperature in the vehicle compartment;

(d) an upper-part temperature setter for setting a temperature of the upper part of the vehicle compartment;

(e) mode doors disposed respectively at a plurality of differently directed outlets for changing the discharge mode of the air-conditioner;

(f) mode control value calculation means for calculating a mode control value concerned in the control of the discharge mode, based on at least the detected representative vehicle compartment temperature and the setting vehicle compartment temperature;

(g) correction means for correcting a changeover criterion based on at least the detected upper-part temperature and the setting upper-part temperature until a deviation of the detected upper-part temperature from the setting upper-part temperature is canceled out;

(h) discharge mode selection means for selecting a discharge mode corresponding to the mode control value, based on the changeover criterion corrected by said correction means; and (i) drive control means for controlling the operation of said mode doors depending on the result of selection by said discharge mode selection means.

2. An apparatus according to claim 1, wherein said correction means is operable to correct a predetermined discharge mode changeover criterion by adding to the same, an upper-part total signal which corresponds to a thermal load in the vicinity of the head of an occupant calculated based on the detected upper-part temperature, a sunlit portion temperature and the setting upper-part temperature and which is multiplied by a predetermined constant.

3. An apparatus for controlling an automobile air-conditioner, comprising:

(a) a vehicle compartment temperature sensor for detecting a representative temperature in a vehicle compartment;

(b) an upper-part temperature sensor for detecting a temperature of an upper part of the vehicle compartment;

(c) a temperature setter for setting a temperature in the vehicle compartment;

(d) an upper-part temperature setter for setting a temperature of the upper part of the vehicle compartment;

(e) mode doors disposed respectively at a plurality of differently directed outlets for changing the discharge mode of the air-conditioner;

(f) air-mix door opening calculation means for calculating an opening of an air-mix door of the air-conditioner based on at least the detected representative vehicle compartment temperature and the setting vehicle compartment temperature;

(g) a mode sensor for detecting a cooling capacity of an evaporator of the air-conditioner;

(h) discharge air temperature calculation means for calculating a temperature of air to be discharged into the vehicle compartment based on the opening of the air-mix door and an output of said mode sensor;

(i) correction means for correcting a changeover criterion based on at least the detected upper-part temperature and the setting upper-part temperature until a deviation of the detected upper-part temperature from the setting upper-part temperature is canceled out;

(j) discharge mode selection means for selecting a discharge mode corresponding to the discharge air temperature calculated by said discharge air temperature calculation means, based on the changeover criterion corrected by said correction means; and (k) drive control means for controlling the operation of said mode doors depending on the result of selection by said discharge mode selection means.

4. An apparatus according to claim 3, wherein said correction means is operable to correct a predetermined discharge mode changeover criterion by adding to the same, an upper-part total signal which corresponds to a thermal load in the vicinity of the head of an occupant calculated based on the detected upper-part temperature, a sunlit portion temperature and the setting upper-part temperature and which is multiplied by a predetermined constant.

5. An apparatus according to claim 3, wherein said discharge air temperature calculation means is operable to calculate the discharge air temperature by adding to the output value of said mode sensor, a value which is calculated by said air-mix door opening calculation means and multiplied by a predetermined constant.

* * * * *